United States Patent [19]
Iorio

[11] Patent Number: 5,970,713
[45] Date of Patent: Oct. 26, 1999

[54] WATER ENGINE

[76] Inventor: Giorgio Di Iorio, 54 Osborne Ave., East Norwalk, Conn. 06855

[21] Appl. No.: 09/015,230

[22] Filed: Jan. 29, 1998

[51] Int. Cl.⁶ .................................................. F03B 17/06
[52] U.S. Cl. ................................................ 60/640
[58] Field of Search ...................... 60/639, 640

[56] References Cited

U.S. PATENT DOCUMENTS

| | | | |
|---|---|---|---|
| 1,036,587 | 8/1912 | Patton et al. | 60/640 |
| 4,209,990 | 7/1980 | Shelton, Jr. | 60/640 |
| 4,295,800 | 10/1981 | Packer . | |
| 4,420,373 | 12/1983 | Egosi . | |
| 4,465,941 | 8/1984 | Wilson et al. . | |
| 4,599,857 | 7/1986 | Kim et al. | 60/640 X |
| 4,691,514 | 9/1987 | Smith . | |
| 4,739,182 | 4/1988 | Kenderi . | |

FOREIGN PATENT DOCUMENTS

| | | | |
|---|---|---|---|
| 719101 | 6/1931 | France | 60/640 |
| 836218 | 4/1938 | France | 60/640 |

*Primary Examiner*—Hoang Nguyen
*Attorney, Agent, or Firm*—Fattibene & Fattibene; Arthur T. Fattibene; Paul A. Fattibene

[57] ABSTRACT

A water engine having a rocking beam that includes a bucket. A reservoir is mounted on each end of the beam. The respective reservoirs are provided with a valved discharged opening which are alternatively actuated as the corresponding bucket is moved to its elevated position. The actuating medium is supplied to each of the reservoirs by a pump. The timing of the opening and closing of the respective reservoir and bucket discharge valves in an alternating sequence are effected by a mechanical linkage arrangement that is rendered responsive to the rocking motion of the beam. The alternating filling and emptying of the respective bucket imparts a continuous oscillating or rocking motion to the rocking beam, whereby a transmission translates the oscillating motion of the beam into rotary motion for driving a suitable work producing machine.

22 Claims, 8 Drawing Sheets

FIG. 9

WATER ENGINE

FIELD OF INVENTION

This invention relates to a water engine, and more specifically to a water engine having a rocking beam fulcrumed adjacent its midpoint which is alternately weighted at the opposed ends thereof with a predetermined quantity of water to impart a continuous rocking motion to the beam to generate an oscillation motion that is translated into a rotary motion to produce useful work.

BACKGROUND OF THE INVENTION

Heretofore, numerous efforts have been made to harness water to generate energy to produce useful work. U.S. Pat. No. 4,295,800 discloses a device for converting energy generated by waves to drive a work producing device. U.S. Pat. No. 4,420,373 is directed to a method and apparatus for the conversion of dissipated heat energy contained in natural or artificial bodies of water near ambient temperature to an industrial process heat, mainly in the form of steam. U.S. Pat. No. 4,465,941 is directed to a water engine for extracting energy from a head of water and having particular application as a tidal barrage or a river barrage. U.S. Pat. No. 4,691,514 is directed to a water engine of the type having float reciprocating vertically within a chamber which is alternately filled and emptied with water. U.S. Pat. No. 4,739,182 is directed to a water power engine which utilizes the energy of a slowly moving large body of water to produce useful work. It appears that there has been a constant challenge to harness the potential and kinetic energy inherent in a body of water to produce useful work in a simple and economical manner.

SUMMARY OF THE INVENTION

An object of this invention is to provide a water engine which is powered by a predetermined quantity of water falling under the influence of gravity to drive a rocking beam for generating an oscillating motion that is readily translated into a rotary motion to produce useful work, whereby the water engine is continuously driven by a constant recirculation of the actuating water medium.

Another object is to provide a water engine that is relatively simple and positive in operation.

The foregoing objects and other features and advantages are attained by a water engine that includes a rocking beam that is suitably supported on a base, about which there is provided a moat for containing the supply of water necessary to effect the actuation of the water engine. Connected to each end of the rocking beam there is provided a bucket having a valved discharge opening for receiving and discharging a quantity of water in accordance with a predetermined alternating sequence so that a continuous rocking motion is imparted to the beam. A pair of reservoirs are provided whereby each of the respective reservoirs are supported above the buckets carried by the opposed ends of the beam. Each of the respective reservoirs have a valved discharge opening whereby the respective discharge openings are valved between open and closed positions in an alternating sequence so that the reservoir valve is opened only when the corresponding bucket carried on the adjacent end of the beam is disposed in the elevated position; and closes immediately as the filled bucket begins to descend toward its lower position. The actuating water is supplied to the respective reservoirs by a pump circulating the water from the moat to each of the respective reservoirs. The timing of the respective reservoir valves and bucket valve members in an alternating sequence is effected by independent linkage systems operatively connected to each of the respective valves that are rendered responsive to the oscillating motion of the rocking beam. The arrangement is such that when one of the buckets is in the elevated position, and the other bucket is in the lower position, the valve in the reservoir adjacent the elevated bucket is opened to discharge a quantity of water into the elevated bucket. Meanwhile, the bucket valve of the lower bucket is shifted to an open position to discharge the water carried thereby into the moat. As the lower bucket is emptied, the elevated bucket weighted with water overbalances the empty bucket and begins to descend to its lower position as the previously emptied bucket rises towards its supply reservoir where the action is repeated. Thus, the alternating filling and emptying of the respective opposed buckets imparts a continuous oscillating motion to the rocking beam. A transmission is interposed between the axle of the rocking beam and a flywheel to translate the oscillating motion imparted to the axle by the rocking beam into rotary motion to drive a generator or other work producing machine.

DETAIL DESCRIPTION

Figure 1:
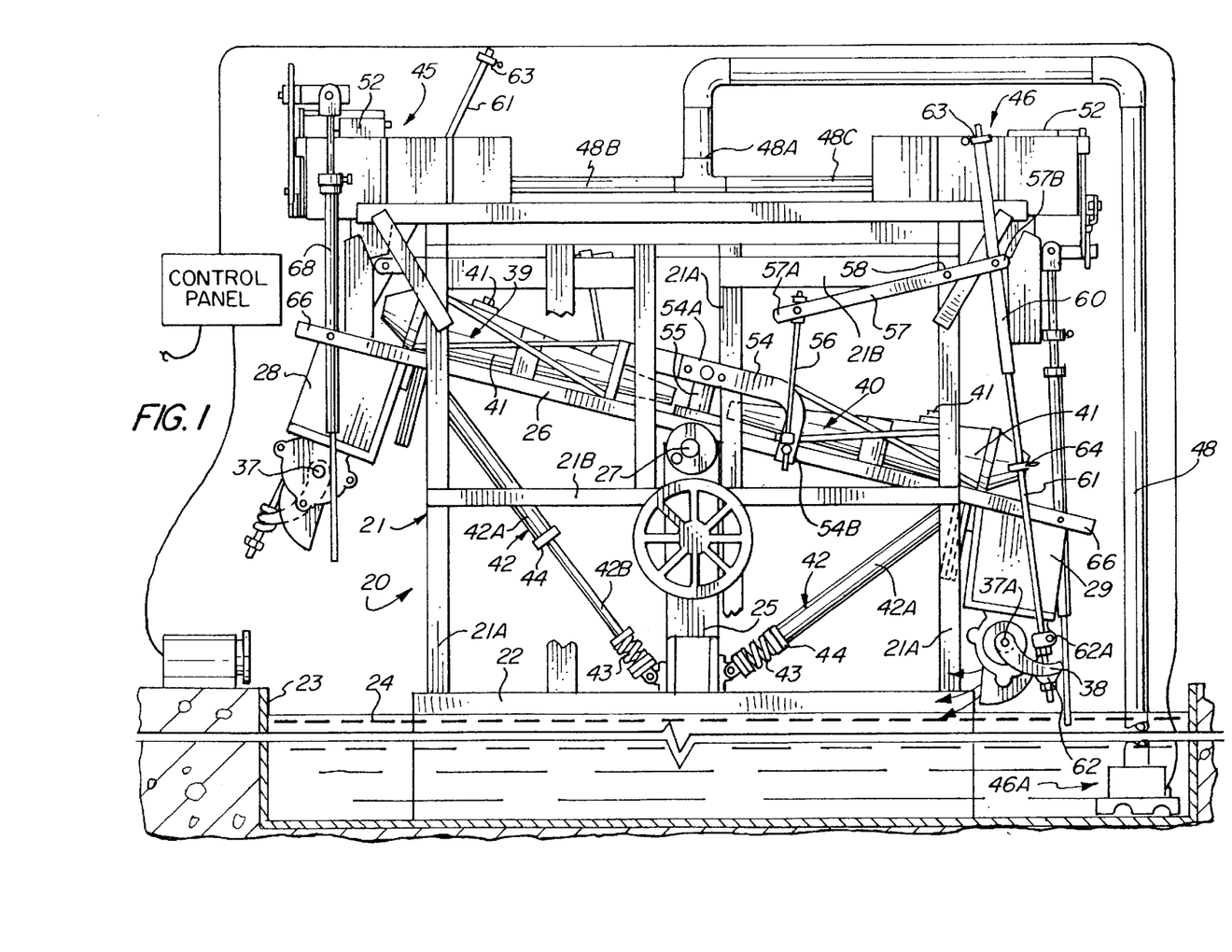
FIG. 1 is a side elevation view of a water engine embodying the present invention.

Referring to the drawings, there is illustrated in FIG. 1 a water engine 20 which includes a support superstructure or frame 21, which comprises a plurality of vertical and horizontal interconnected structural members 21A and 21B respectively to define a rigid framework upon which the component parts, as will be hereinafter described, are supported. The vertical structural members 21A are suitably supported on a base 22, e.g. a bed of concrete or like solid structure. Surrounding the base 22 is a moat or containment 23 sufficiently large to contain a supply of water 24 necessary to drive the water engine 20, as will be hereinafter described.

Centrally located on the base 22 is a pedestal 25 for supporting a rocking beam 26. The rocking beam 26 is fulcrum at its midpoint about a transversely extending axle 27 which is fixedly connected to the rocking beam so as to oscillate as the rocking beam seesaws about its axle 27, as will be described. It will be understood that the oscillating axle 27 is supported in a suitable bearing mounted on the upper end of the pedestal 25 in which the axle 27 is permitted to oscillate as the rocking beam seesaws about its fulcrum point or axle 27.

Figure 4:
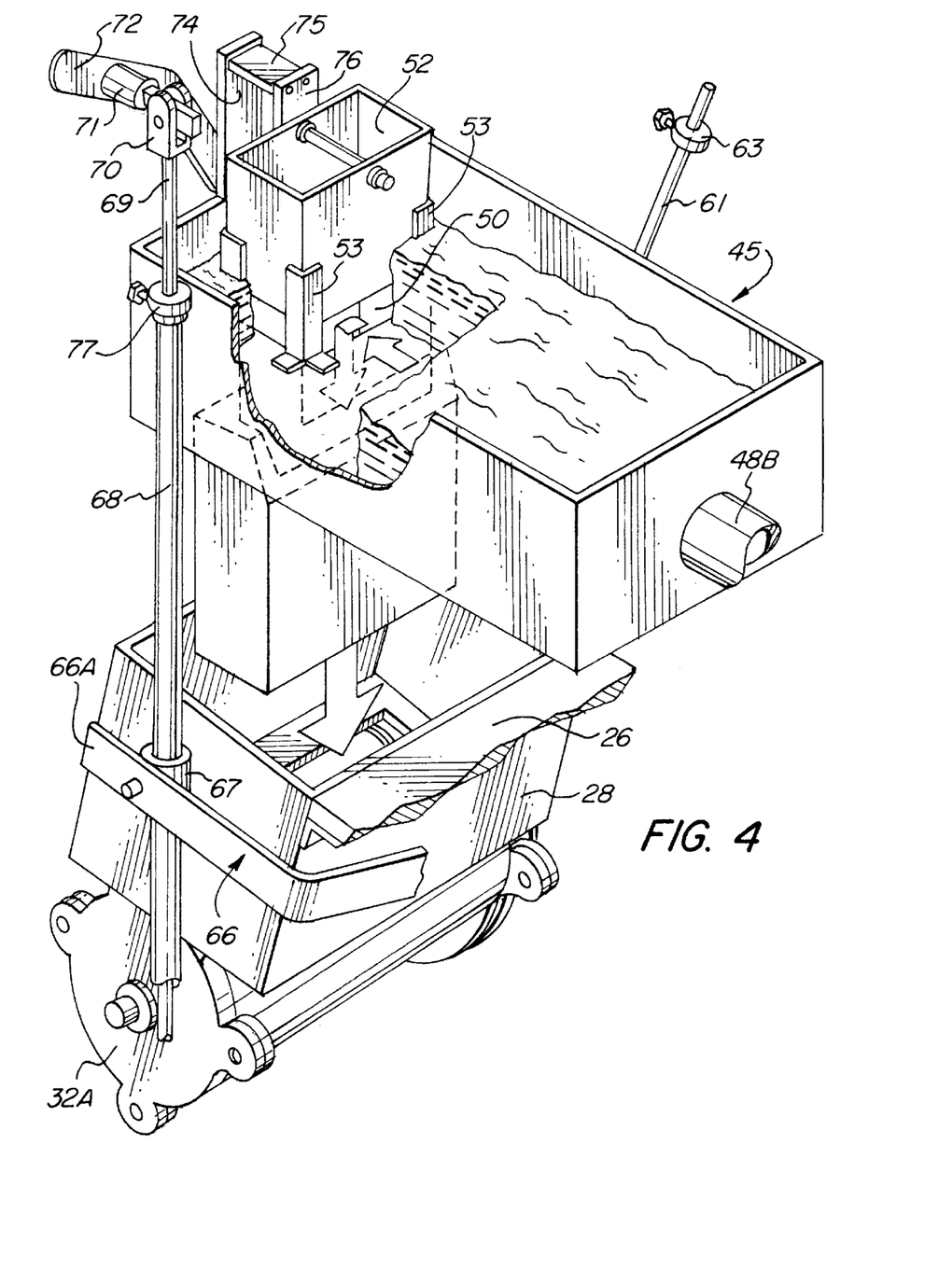
FIG. 4 is a fragmentary perspective view illustrating the relative relationship of the components as shown in FIG. 3.
Figure 5:
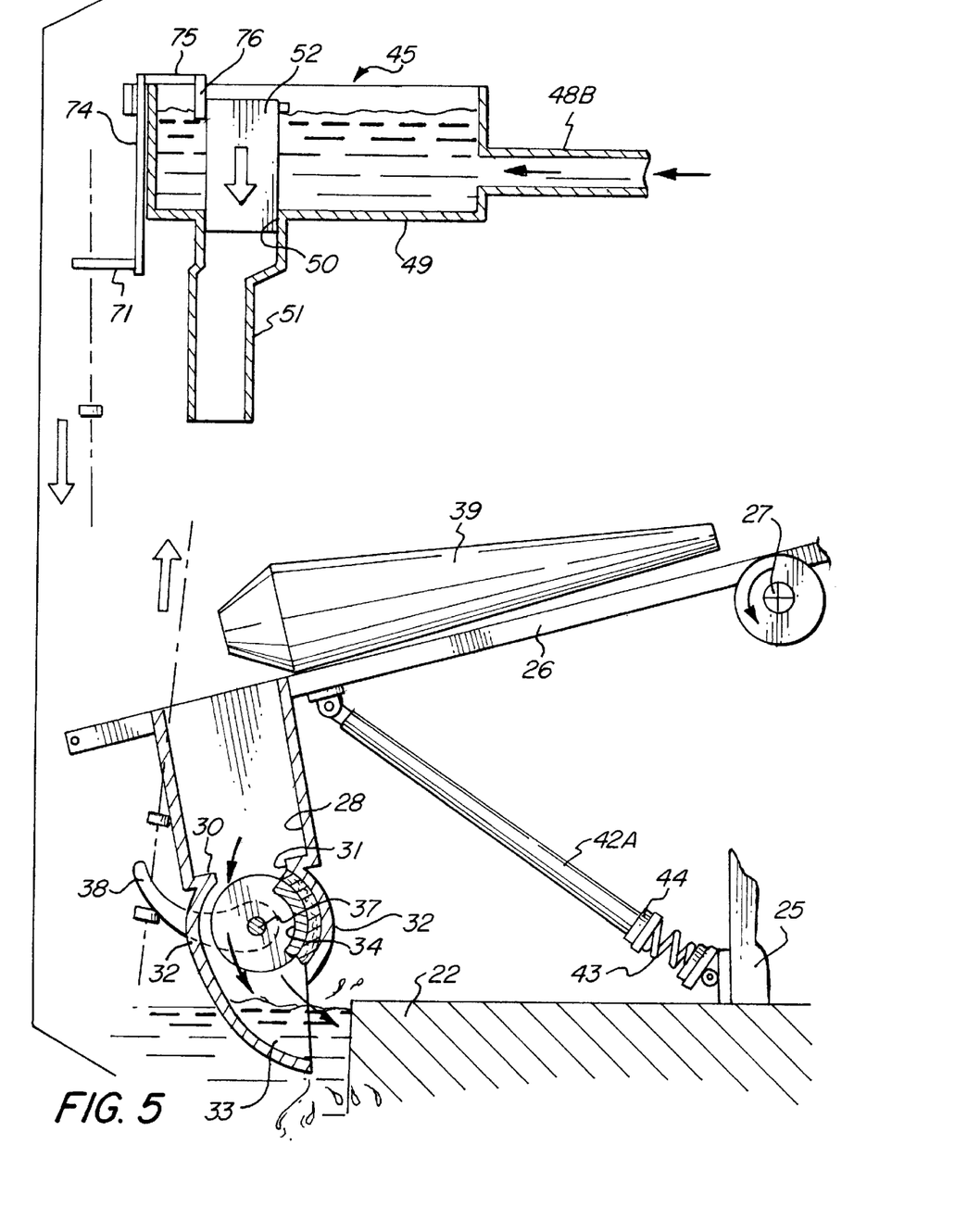
FIG. 5 is a fragmentary sectional view of the water engine of FIG. 1 illustrating the relative relationship of the component parts of the left end portion of the water engine of FIG. 1 at the end of the power stroke of the operating cycle.
Figure 6:
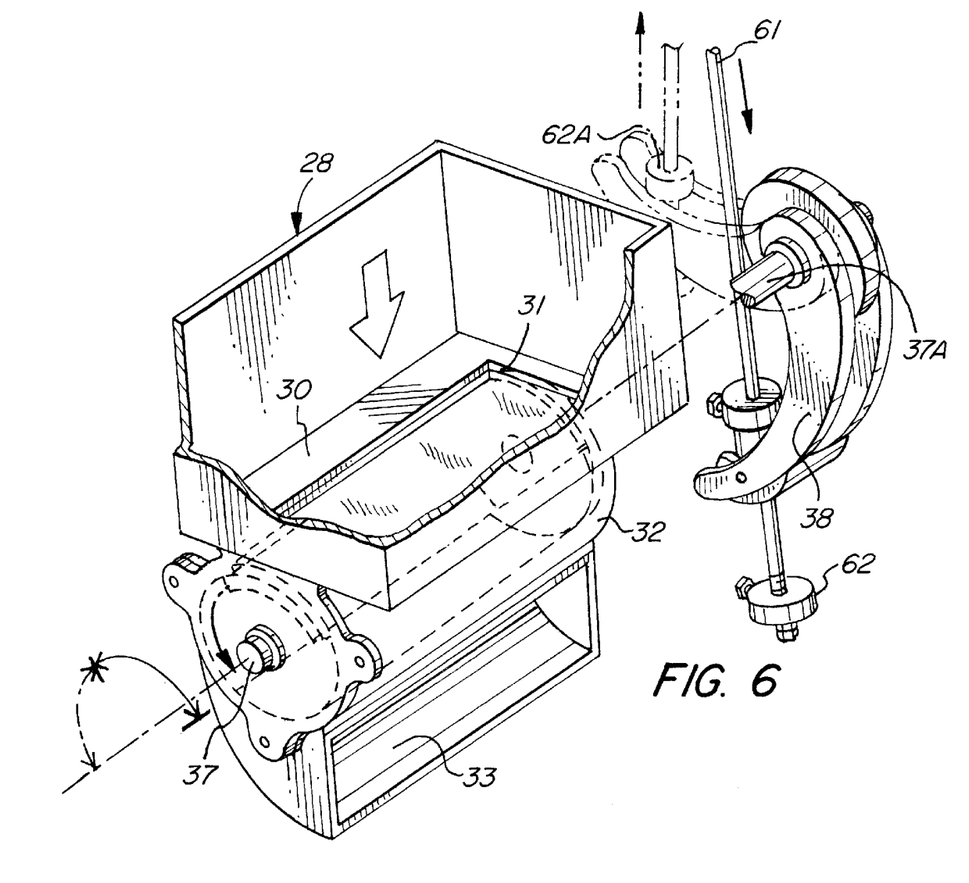
FIG. 6 is a fragmentary perspective view shown partly in section of the bucket assembly.

In accordance with this invention, a receptacle or bucket 28 and 29 is connected to and supported on the opposite ends of the rocking beam 26. Each of the receptacles or buckets 28, 29 are similarly constructed, but opposite in hand. The receptacles or buckets 28, 29, as best seen in FIGS. 4 to 6, comprise a generally rectangular bucket for receiving a quantity of water in a predetermined alternating sequence to impart a seesaw motion to the rocking beam as will be described. Each receptacle or bucket 28, 29 is provided with a bottom wall 30 having a relatively large opening 31 formed therein. Circumscribing opening 31 and depending from the bottom wall 30 is a generally cylindrical housing 32 closed by opposed end walls 32A that define therebetween a discharge opening 33 which is spaced from opening 31 formed in the bottom wall 30 of the receptacle.

Figure 7:
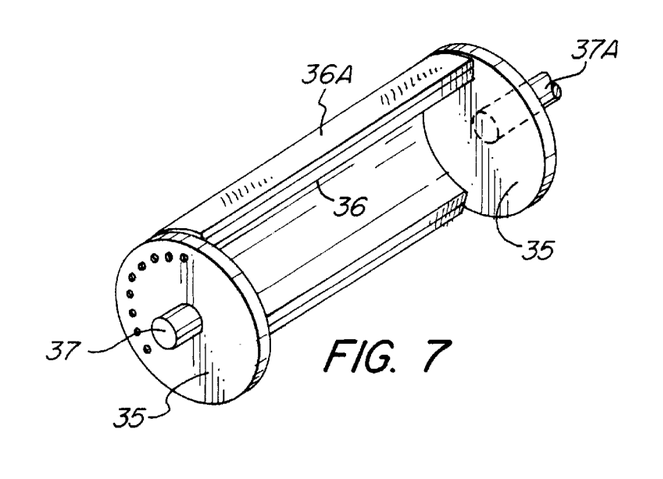
FIG. 7 is a perspective detail view of the oscillating valve incorporated in the bucket assembly of FIG. 6.

Rotatably journalled between the opposed end walls 32A, 32A within the discharge housing 32 is an oscillating valve 34. As best seen in FIGS. 6 and 7, the oscillating valve 34 includes a pair of circular end plates 35, 35. Connected between the respective end plates 35, 35 is a curvilinear valving member 36 arranged to circumscribe a circumferential portion of the end plates 35, 35, as best shown in FIG. 7. The exterior surface of the valving member 36 may be covered by a suitable sealing material 36A, which may be comprised of rubber, leather or the like to provide a suitable seal when the valve 34 is rotated to the closed position. Each of the respective end plates 35, 35 is provided with an outwardly extending pinion 37, 37A by which the oscillating valve 34 is rotatably supported between the end walls 32A, 32A of the cylindrical discharge housing 32. As will be hereinafter described, the oscillating valve 34 is arranged to oscillate about its pinions 37, 37A in a manner to open or close the opening 31 formed in the bottom wall 30 of the receptacle or bucket 28 or 29. Operatively connected to pinion 37A of the valve 34 is an actuating lever 38 to effect the actuation of the oscillating valve 34 between the open and closed positions thereof in a predetermined sequence as will be described.

Connected to and supported on the rocking beam 26 to either side of the fulcrum or axle 27 are weighted members 39 and 40, which are similarly constructed. As shown, each weighted member 39 and 40 comprises a hollow tank which is specifically configured in a generally conical shape with the apex or narrow end disposed immediately adjacent the fulcrum or axle 27 and which progresses or diverges outwardly toward the opposed ends of the beam 26. Each tank is provided with a filler or opening sealed by a suitable closure or cap 41. The respective tanks may be filled with a suitable weighted material, e.g. sand or liquid to impart additional weight onto the beam 26 to enhance the momentum imparted to the oscillating beam, as will be herein described. The arrangement and shape of the respective tanks, when weighted or filled, also functions to shift the weight of the beam outwardly toward the respective ends of the beam 26 so as to increase the forces acting on the ends of the beam 26 during the operation thereof.

To absorb any shocking of the weighted oscillating beam 26 during the operation thereof, suitable shock absorbing means 42 are provided. In the illustrated embodiment, the shock absorbing means 42 includes a sleeve 42A which is suitably journalled at one end to the underside of the beam 26, and which is slidably mounted on a rod 42B which is pivotally anchored at the lower end to the base of the pedestal 25. Thus, as seen in FIG. 1, when the lower end of the beam 26 bottoms out, the stop 44 on the end of sleeve 42A engages the compression spring 43 to result in dampening any shocking which may occur during the oscillation of the rocking beam 26.

Figure 8:
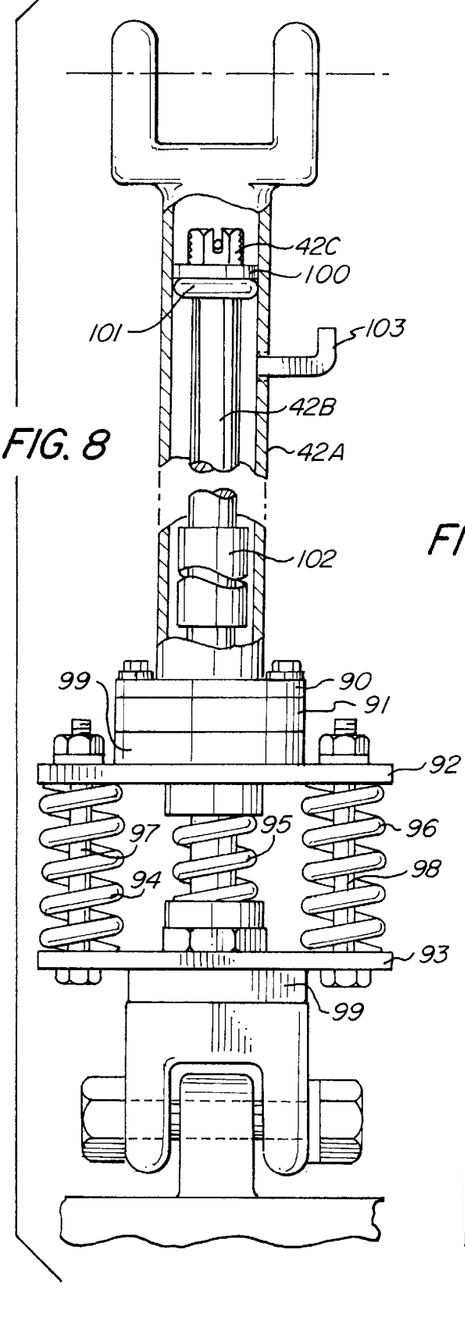
FIG. 8 is a detail sectional view of the shock absorbing means showing the parts in a contracted position.
Figure 9:
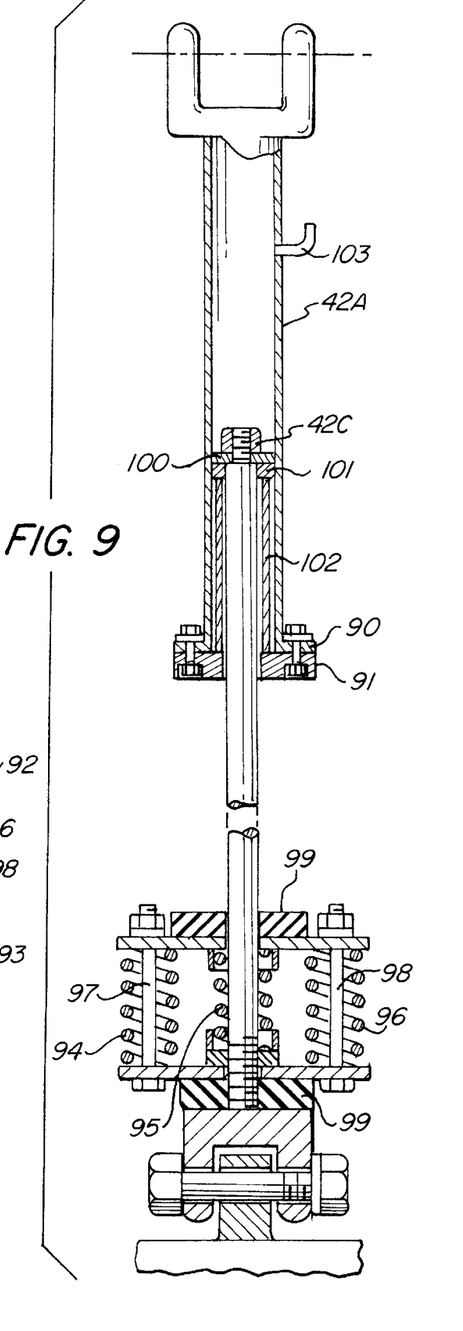
FIG. 9 is a detail sectional view of the shock absorbing means in an extended position.

As more specifically detailed in FIGS. 8 and 9, the shock absorbing means 42 includes sleeve 42A having its upper end pivotally connected to the undersurface of the rocking beam 26. Connected to the lower end of sleeve 42A is a flange 90 to which a stop flange 91 is bolted to form the stop 44. The rod 42B, which slidably receives the sleeve 42A, is pivotally connected at its lower end to the base of pedestal 25.

A pair of spaced apart plates 92 and 93 are loosely mounted on the lower end of rod 42B. Each of the spaced apart plates 92, 93 is provided with aligned holes through which rod 42B extends. As shown in FIG. 8, three heavy duty compression springs 94, 95, 96 are interposed between the spaced plates 92, 93. Bolt 97, 98 extends between plates 92 and 92 for maintaining the respective endmost springs 94 and 96 in place between plates 92, 93. The center spring 95 is disposed about rod 42B. The arrangement thus described is such that as the end of the rocking beam bottoms out as shown in FIG. 1, the sleeve 42A of the shock absorbing means 42 engages the compression spring assembly 94, 95, 96 to absorb any impact caused by the rocking beam. To further minimize shocking, a rubber pad 99 may be interposed on top and bottom of the spaced apart plates 92, 93 as shown.

The upper end of rod 42B is provided with a threaded portion 42C for adjustably receiving a stop nut 100 and an associated stop washer 101. To provide an adjustment to control the amount of angular displacement of the rocking beam 26, a nipple 102 is loosely mounted on rod 42B and is arranged to ride on rod 42B as the rocking beam oscillates. Thus, by varying the length of nipple 102 slidably disposed on rod 42B, the distance between the rise and fall of the rocking beam ends can be controlled or adjusted. A lubricating nipple or port 103 is connected to sleeve 42A to provide a means for lubricating the sleeve 42A so as to minimize friction between the relatively movable sleeve 42A and rod 42B.

Supported at the upper end of the frame or superstructure 21 are oppositely disposed reservoirs 45 and 46 for containing a supply of water. The respective reservoirs are supplied with water from the water supply 24 contained in the moat 23. This is attained by a pumping means 46. As shown in FIG. 1, the pumping means 46A may comprise an electrical pump whereby water 24 from the moat 23 is pumped through conduit 48 to a T connection 48A, which connect to opposed branch conduits 48B, 48C for supplying each of the respective reservoirs 45, 46 with water.

Figure 3:
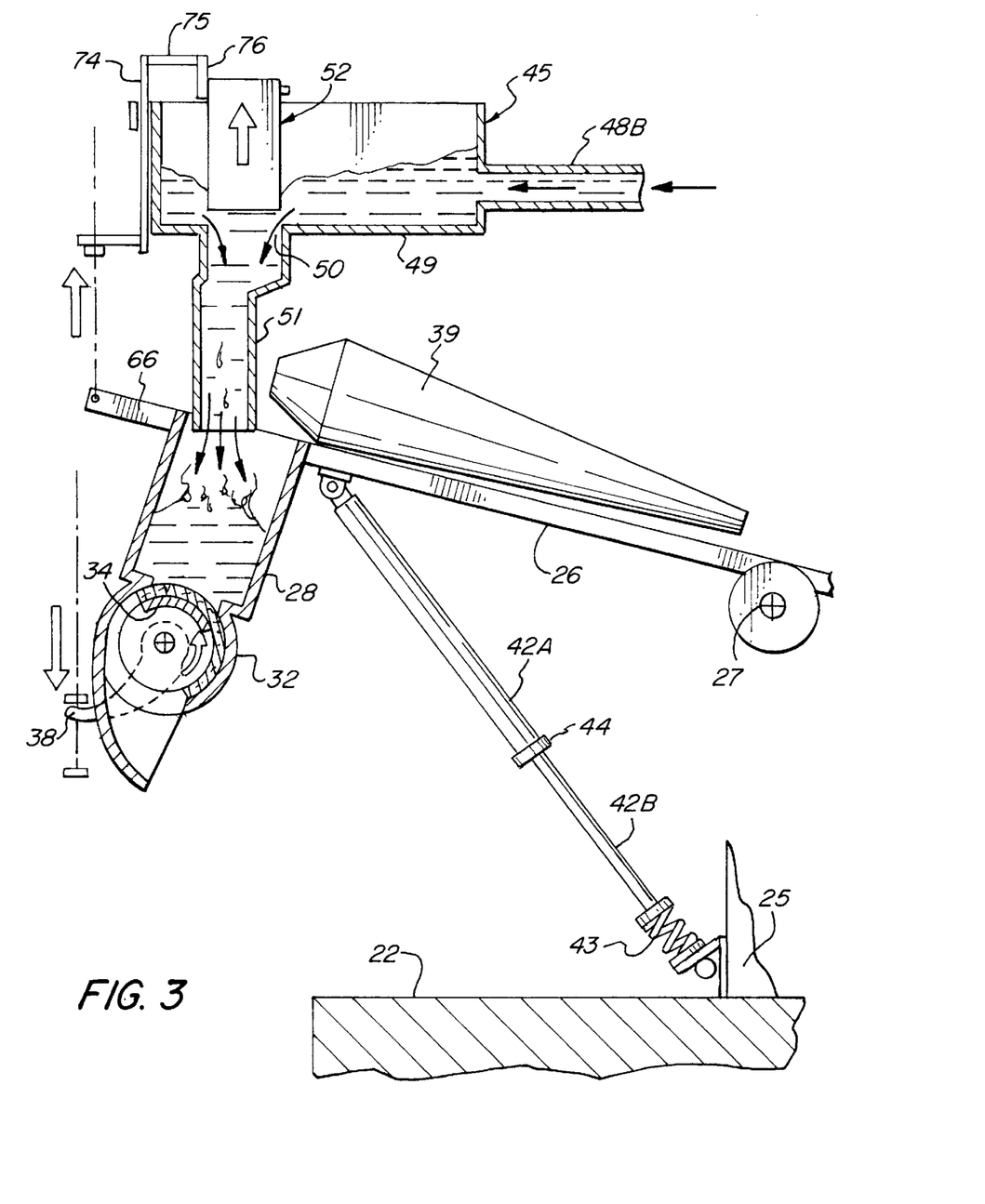
FIG. 3 is a fragmentary side elevation sectional view of the water engine of FIG. 1 illustrating the relative relationship of the component parts of the left end portion of FIG. 1 at the initiation of the power stroke of the operating cycle.

As best seen in FIGS. 4 and 5, the upper reservoir 45 comprises a rectangular tank which is provided with a bottom wall 49 formed with an opening 50 formed therein. Circumscribing the opening 50 and depending from the bottom wall 40 is a chute 51 for directing water from the reservoir 45 to the bucket 28 connected to the corresponding end of the rocking beam 26 when the corresponding end of the beam is at its elevated position, as shown in FIG. 3. A valve 52 is operatively associated with opening 50 to open and close opening 50 is a predetermined sequence. As shown, the valve 52 comprises a plug type valve having a shape corresponding to the shape of opening 50 so that when the plug valve 52 is lowered as shown in FIG. 5, the opening 50 is closed so as to prevent any water in the reservoir 45 from being discharged therefrom. When the plug valve 52 is raised as shown in FIG. 3, the water in the reservoir 45 is discharged from the reservoir 45 to the bucket 28. The opening 50 of the reservoir is sufficiently large so that the volumetric amount of water discharging therethrough when the valve 52 is opened, is sufficient to fill the bucket 28 virtually instantaneously. As shown in FIG. 4, suitable angle guides 53 are located at the corners of the opening 50 for receiving the plug valve and guiding the plug valve 52 during its vertical displacement between the opening and closing positions thereof. It will be understood that reservoirs 45 and 46 are similarly constructed, but opposite in hand.

In accordance with this invention, the plug valves 52 controlling the discharge of the water from the respective reservoir 45, 46 to their corresponding buckets 28, 29, and the associated oscillating valves 34 for controlling the filling and the emptying of the buckets 28, 29 respectively, are mechanically actuated and timed to be sequentially opened and closed by the seesawing or oscillating action of the rocking beam 26.

Figure 1A:
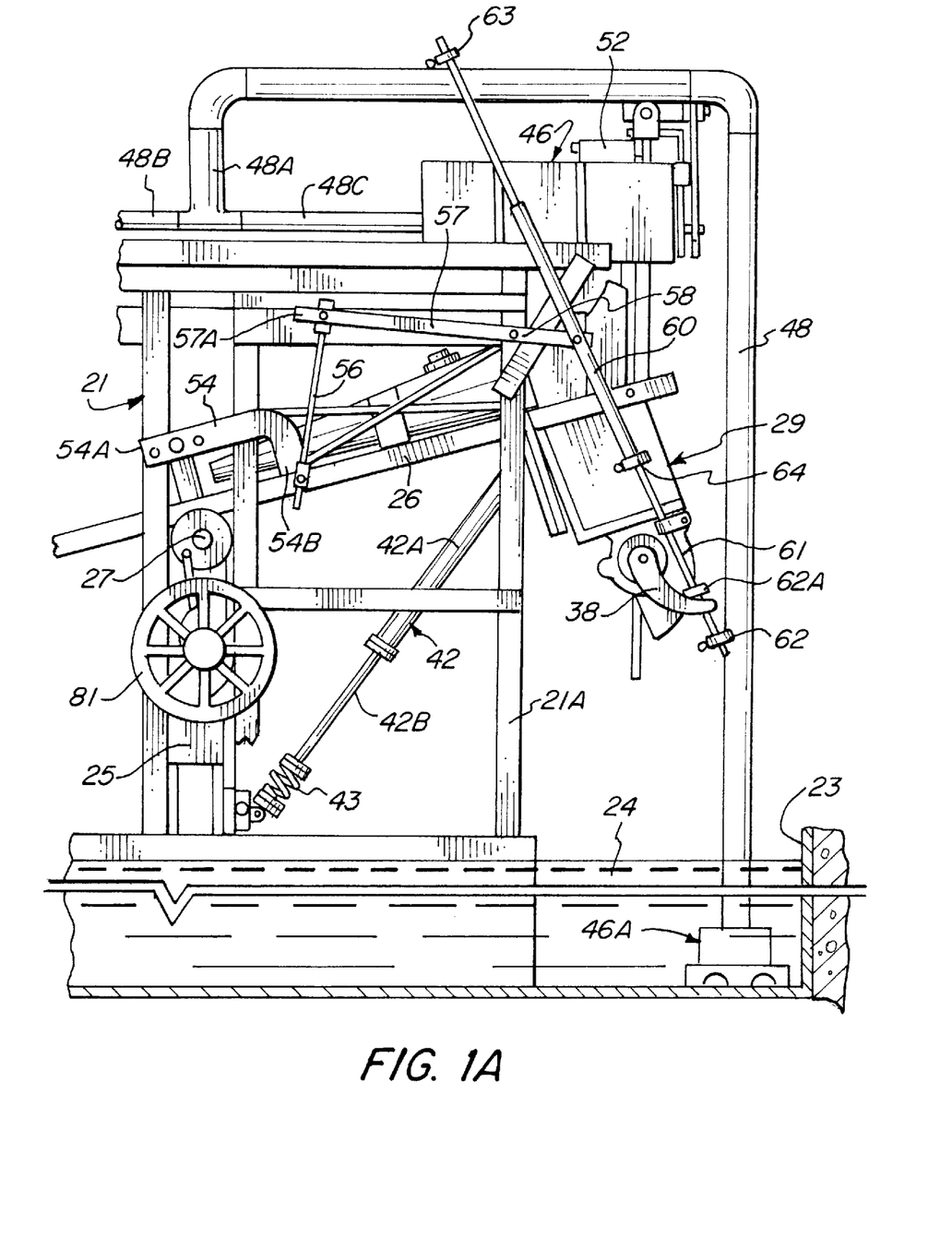
FIG. 1A is a partial side elevation view of the right end portion of the water engine of FIG. 1 illustrating the right end of the rocking beam in an elevated position.

The control for actuating the respective oscillating valves 34 of the respective buckets between the open and closed position includes a linkage arrangement which is best illustrated in FIGS. 1 and 1A. Referring to FIG. 1, the linkage arrangement for actuating the respective oscillating valves 34 includes an L shaped bracket 54, which is fixed at one end 54A to a base 55 connected to the beam 26. Journalled at the other end 54B of the L shaped bracket 54 is one end of link 56. The other end of link 56 is journalled to end 57A of a lever arm 57, which is pivotally mounted intermediate the ends thereof to a vertical upright 21A by a pivot pin 58. The other end 57B of the lever arm 57 is pivotally connected to an elongated guide sleeve 60, which is slidably mounted about the valve actuating rod 61. The lower end of the actuating rod 61 is provided with a stopper 62 arranged to engage the actuating arm 38 of the oscillating valve 34 to shift the oscillating valve to an open position for discharging the water from the associated bucket 29 when in the lowest-most position thereof, as best seen in FIG. 1.

Mounted in spaced relationship on the actuating rod 61 are a pair of spaced apart limit stops 63 and 64. The arrangement of the linkage assembly controlling the oscillating valve 34 is such that when the bucket 29 reaches its lowest-most position, the lever arm 57 is tilted so that the guide sleeve 60, slidably mounted on rod 61, engages the upper limit stop 63, causing the actuating rod 61 to be raised an amount sufficient to effect the engagement of the stopper 62 with the actuating arm 38 to shift arm 38 and the connected oscillating valve member 36 counterclockwise to an open position, whereby the water in bucket 29 is discharged into the moat 23. As the emptied bucket begins to rise when the other weighted end of the beam descends, the guide sleeve, in moving downwardly relative to the actuating rod 61, engages the lower limit stop 64 to cause the associated actuating rod 61 to move downwardly an amount to shift the actuating arm 38 and associated oscillating valve member 36 clockwise to its closed position. This is effected by a second stopper 62A mounted on the actuating rod 61 to engage the actuating arm 38 of the oscillating valve 34 to shift the oscillating valve to its closed position as the bucket 29 is being raised to its elevated position. See FIG. 1A wherein the linkage mechanism controlling the oscillating valve member 36 is illustrated in the closed position. It will be understood that a similar linkage arrangement is provided on the other end of the rocking beam 26 on the opposite side thereof to effect the operation of the oscillating valve 34 controlling the filling and discharging of water from the other bucket 28, except that the sequence of operation is opposite or reverse to that occurring at the other end of the beam 26.

The operation of the plug valve 52 controlling the discharge of water from the respective upper reservoirs 45 and 46 are also mechanically controlled to operate in sequence with the opening and closing of the oscillating valves 34. This is attained by the linkage arrangement as best seen in FIGS. 1, 2 and 4.

Figure 2:
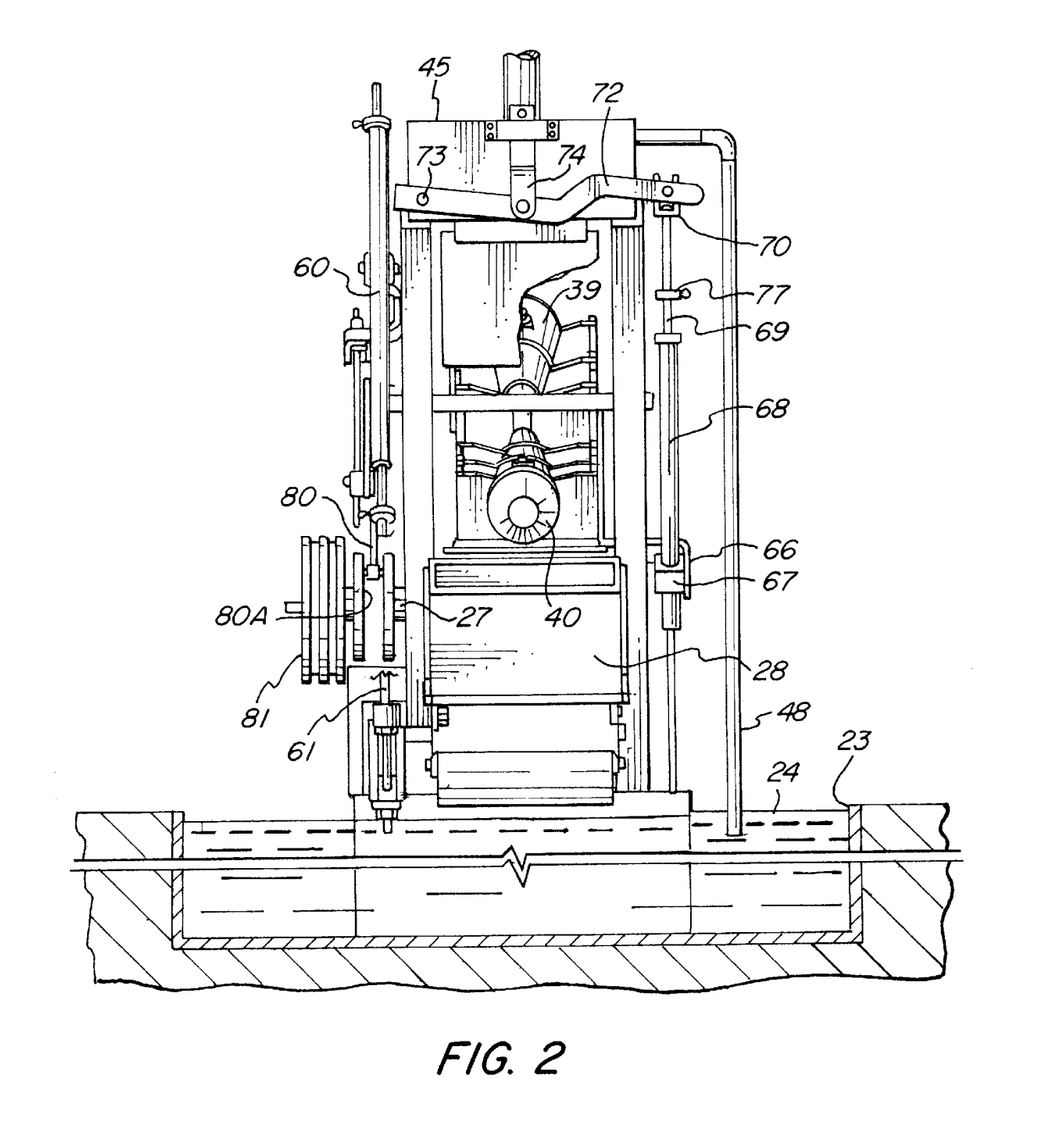
FIG. 2 is an end view of the water engine of FIG. 1.

Referring to FIGS. 1, 2 and 4, a yoke bracket 66 is connected at each end of the rocking beam 26 so as to extend adjacent the side of the respective buckets 28, 29. Swivelly connected to the extended arm 66A of the yoke bracket 66 is a bushing 67 for supporting an elongated guide sleeve 68. An actuating rod 69 is slidably supported within its associated guide sleeve 68 whereby the guide sleeve is freely slidable relative to the actuating rod 69. Connected to the upper end of the actuating rod 69 is a bifurcated coupler 70. Pivotally connected to the bifurcated coupler 70 is a connecting link 71. The other end of the connecting link 71 is fixedly connected to a lever 72. The other end of the lever 72 is pivoted to the adjacent frame or upper reservoir 45 about a suitable pivot pin 73. Pivotally connected intermediate the opposed ends of the actuating lever 72 is a vertically extending arm or bracket 74. Connected to the upper end of the arm or bracket 74 is a lateral extension 75. A depending bracket 76 connected to the end of extension 75 is fixedly connected to the plug valve 52 that controls the opening and closing of the opening 50 in the bottom wall 49 of its corresponding reservoir. Connected to the actuating rod 69 at a predetermined point is a stop 77.

The arrangement of the linkage assembly for controlling the actuation of the plug valve 52 is such that the plug valve is shifted to an open position, when the bucket 28 is disposed in its uppermost position, as best seen in FIG. 4. This is attained by the upper end of the guide sleeve 68 engaging the stop 77 on the actuating rod 69 to be lifted therewith to a raised position. In doing so, the actuating lever 72 is pivoted in a counterclockwise direction about its pivot 73, as best viewed in FIG. 2, to lift the plug valve 52 to the opened position as best seen in FIG. 4. As the volumetric amount of water is being discharged from the reservoir 45 to fill the corresponding bucket 28, as seen in FIG. 4, the bucket 29 at the other end of the beam is being emptied, causing the weighted end of the rocking beam to fall. In doing so, the guide sleeve 68 is lowered relative to its actuating rod 69, causing the plug valve 52 to be reseated to the closed position.

As it will be hereinafter described, the seesawing motion of the rocking beam 26 during operation about its axle 27 will impart an oscillating motion to the axle 27. A transmission means in the form of a crank shaft 80A and crank 80 is interconnected between the axle 27 and a flywheel 81, whereby the oscillating motion of the axle 27 is translated into rotary motion to provide a power output which may be utilized to drive a suitable generator or other energy producing machine for performing work.

From the foregoing description, the operation of the water engine 20 is as follows. In the starting position, the rocking beam is slightly over-balanced so that one end of the beam is in the raised position as the other end is in the lowered position, e.g. as seen in FIG. 1. In this position, the plug valve 52 controlling reservoir 45 is opened and the oscillating valve controlling the discharge opening of the corresponding bucket 28 is closed. At the opposite end, the plug valve 52 controlling reservoir 46 is closed and the oscillating valve controlling the discharge of the corresponding bucket 29 is in the open position.

To initiate the operation of the water engine, the pump 46A is actuated, whereby the water 24 in the moat 23 is pumped to effect the filling of the reservoirs 45 and 46. As the plug valve 52 controlling reservoir 45 is opened, the water flowing into reservoir 45 is immediately discharged through opening 50 to fill the adjacent corresponding bucket 28. As the filled bucket 28 begins to descend, the linkage mechanism controlling the plug valve 52 causes the plug valve to seal the opening 50 of reservoir 45 and the opposite empty bucket 29 begins to move to its elevated position as the water filled bucket 28 descends. As the empty bucket 29 is raising, the linkage mechanism 56, 57, 60 and 61 causes the oscillating valve member 36 controlling the discharge opening of the empty bucket 29 to be shifted to the closed position. When the filled bucket 28 reaches its lowermost position, the linkage mechanism described, which controls the actuation of the oscillating valve, causes the oscillating valve to be shifted to its open position to discharge the water therefrom. In the meanwhile, as the emptied bucket 29 approaches its elevated position, the linkage mechanism controlling the plug valve 52 in reservoir 46 lifts the plug valve 52 to the opened position, whereby water from reservoir 46 fills bucket 29, as the water in the lowered bucket 28 is being discharged. The weight of the water in bucket 29 overbalances the beam 25 so that the bucket 28, which has discharged its water, begins to rise and the weighted bucket 29 begins to fall. In doing so, the oscillating movement of the axle 27 as the beam is repeating its alternating rising and falling, is translated into rotary motion through the medium of a transmission, e.g. a crank arm and cam shaft. The arrangement is such that the seesawing of the beam 26 is continued as long as water is being pumped from the moat to supply the respective reservoirs 45 and 46.

It will be noted that the linkage mechanism controlling the respective oscillating valves of buckets 28 and 29 are similar but are actuated in a reserve manner so that when one oscillating valve is closed, the other is opened. The linkage mechanism operating the plug valve 52 controlling the sequential discharge of water from the respective reservoirs 45 and 46 are similar, but function in an alternating manner so that when one plug valve is shifted to the open position, the other plug valve is in the closed position and vice versa.

From the foregoing, it will be apparent that the operation of the water engine is continuous and automatic as long as water is being supplied to the respective reservoirs.

While the water engine 20 has been described as requiring a pair of reservoirs 45 and 46 for alternate charging of the respective buckets 28 and 29 with water to effect the oscillation of the beam, the water engine 20 can be operated utilizing only a single reservoir and a single bucket. In this alternate embodiment, one end of the rocking beam may be weighted by a solid mass having a weight which is slightly less than the weight of water being discharged into the bucket located at the other end of the beam, whereby the weight of the water will over balance the weighted mass on the other end of the beam. In this modified version, the linkage mechanism controlling the sequential operation of the plug valve 52 and the oscillating valve member 36 are the same as herein described, and are required only at one end of the engine. Thus, when the water is discharged from the single bucket, as hereinbefore described, the other end weighted by the solid mass, being heavier than the weight of the empty bucket, will fall under the influence of gravity causing the empty bucket to rise to its elevated position to again receive a volume of water sufficient to overbalance the weighted mass on the other end of the beam. Thus, it will be apparent that the water engine is rendered operative by utilizing a single reservoir and associated bucket as long as the other end of the beam is weighted by a mass having a weight which is less than the total weight of the water and bucket located on the other end of the rocking beam.

While the present invention has been described with respect to a particular embodiment, modifications and variations may be made without departing from the spirit or scope of this invention.

What is claimed is:

1. A water engine comprising:

a rocking beam having opposed ends, a fulcrum adjacent a midpoint of said rocking beam whereby said rocking beam may seesaw thereabout, a weighted member supported on said rocking beam on opposite sides of said fulcrum, said respective weighted members being proportioned so that the weight thereof progressively increases as said weighted member extends away from said fulcrum, means for periodically depositing a predetermined quantity of water on at least one end of said rocking beam sufficient to overbalance the other end of said rocking beam, and causing said water weighted one end of said beam to fall to a predetermined lower lever, means for relieving said one end of the water deposited on said one end at said predetermined lower lever, said other end being weighted to overbalance said lowered one end when relieved of said water to cause said one end to rise to a predetermined upper level, and means for translating the seesawing motion imparted to said rocking beam to rotary motion.

2. A water engine as defined in claim 1 wherein said means for periodically imparting said weight on said one end of said beam comprises:

a reservoir for containing a supply of water supported above said one end of said beam, said reservoir having an opening through which water is discharged therefrom a valve means for controlling the opening and closing of said opening, and means for actuating said valve means for periodically shifting said valve means between open and closed position to periodically input a water weight on said one end of said beam to effect a seesawing motion to said beam.

3. A water engine as defined in claim 2 and including:

a bucket connected to said one end of said beam for receiving the water from said reservoir, said bucket having a discharge opening, and a valve member for opening and closing said bucket discharge opening, and means for actuating said valve member between said open and closed position whereby said valve member is shifted to the open position as said one end reaches its lower level, and to a closed position as said one end is rising to its upper level adjacent said reservoir.

4. A water engine as defined in claim 1 and including a pair of tanks supported on said beam, each of said pair of tanks being supported on said beam on opposite sides of said fulcrum means.

5. A water engine comprising:

a rocking beam having opposed ends, means for fulcruming said rocking beam adjacent a midpoint thereof whereby said rocking beam may seesaw thereabout, means for periodically depositing a predetermined quantity of water on at least one end of said rocking beam sufficient to overbalance the other end of said rocking beam, and causing said water weighted one end of said beam to fall to a predetermined lower lever, means for relieving said one end of the water deposited on said one end at said predetermined lower lever, said other end being weighted to overbalance said lowered one end when relieved of said water to cause said one end to rise to a predetermined upper level, and means for translating the seesawing motion imparted to said rocking beam to rotary motion, said means for periodically imparting said weight on said one end of said beam including a reservoir for containing a supply of water supported above said one end of said beam, said reservoir having an opening through which water is discharged therefrom a valve means for controlling the opening and closing of said opening, and means for actuating said valve means for periodically shifting said valve means between open and closed position to periodically input a water weight on said one end of said beam to effect a seesawing motion to said beam, a bucket connected to said one end of said beam for receiving the water from said reservoir, said bucket having a discharge opening, and a valve member for opening and closing said bucket discharge opening, and means for actuating said valve member between said open and closed position whereby said valve member is shifted to the open position as said one end reaches its lower level, and to a closed position as said one end is rising to its upper level adjacent said reservoir, a pair of tanks supported on said beam, each of said pair of tanks being supported on said beam on opposite sides of said fulcrum means, each of said tanks are generally conical in configuration having their respective apex adjacent said fulcrum means and said tanks diverging outward toward the adjacent ends of said rocking beam.

6. A water engine as defined in claim 5 wherein each of said tanks is filled with a weighted medium.

7. A water engine as defined in claim 6 wherein said weighted medium is water.

8. A water engine as defined in claim 6 wherein said weighted medium is sand.

9. A water engine comprising:

a base, a moat for containing a supply of water disposed adjacent said base, a rocking beam mounted on said base, said beam having opposed ends arranged to rise and fall, a transverse axle connected to said beam adjacent its midpoint about which the beam rocks as said opposed ends alternately rise and fall between an elevated and lower position to impart an oscillation motion to said axle, a weighted member supported on said rocking beam on opposite sides of said transverse axle, said weighted members being proportioned so that the weight thereof progressively increases as said weighted member extends away from said transverse axis, a pair of reservoirs, each of said reservoirs being supported above a corresponding opposed end of said rocking beam, each of said reservoirs having a discharge opening, a valve for sequentially opening and closing said discharge opening of its respective reservoir, means for pumping water from said moat to each of said reservoirs, a bucket connected to each end of said beam, each of said buckets having an outlet, a valve member for sequentially opening and closing said outlet, and means for actuating said reservoir valve and said bucket valve member in a predetermined sequence whereby the valve of one reservoir is shifted to an open position as the valve of the other reservoir is closed, and means for sequentially actuating the valve member of the elevating bucket to a closed position and shifting the valve member of the other bucket to an open position as it reaches its lower position.

10. A water engine as defined in claim 9 and including a means for translating the oscillating movement of said axle to a rotary motion.

11. A water engine as defined in claim 10 wherein said translation means includes:

a flywheel, a crank shaft connected to said flywheel, and a crank arm interconnected between said axle and said crank shaft whereby the oscillating motion of said axle imparts the rotary motion of said flywheel.

12. A water engine comprising:

a base, a moat for containing a supply of water disposed adjacent said base, a rocking beam mounted on said base, said beam having opposed ends arranged to rise and fall, a transverse axle connected to said beam adjacent its midpoint about which the beam rocks as said opposed ends alternately rise and fall between an elevated and lower position to impart an oscillation motion to said axle, a pair of reservoirs, each of said reservoirs being supported above a corresponding opposed end of said rocking beam, each of said reservoirs having a discharge opening, a valve for sequentially opening and closing said discharge opening of its respective reservoir, means for pumping water from said moat to each of said reservoirs, a bucket connected to each end of said beam, each of said buckets having an outlet, a valve member for sequentially opening and closing said outlet, and means for actuating said reservoir valve and said bucket valve member in a predetermined sequence whereby the valve of one reservoir is shifted to an open position as the valve of the other reservoir is closed, and means for sequentially actuating the valve member of the elevating bucket to a closed position and shifting the valve member of the other bucket to an open position as it reaches it lower position, a pair of conical tanks, each of said conical tanks being connected to said rocking beam on opposite sides of said transverse axle whereby the apex end of the respective tanks are located adjacent the transverse axle and diverge outward toward the corresponding end of said beam.

13. A water engine as defined in claim 12 and including a weighted medium disposed within each of said tanks.

14. A water engine comprising:

a base, a moat for containing a supply of water disposed adjacent said base, a rocking beam mounted on said base, said beam having opposed ends arranged to rise and fall, a transverse axle connected to said beam adjacent its midpoint about which the beam rocks as said opposed ends alternately rise and fall between an elevated and lower position to impart an oscillation motion to said axle, a pair of reservoirs, each of said reservoirs being supported above a corresponding opposed end of said rocking beam, each of said reservoirs having a discharge opening, a valve for sequentially opening and closing said discharge opening of its respective reservoir, means for pumping water from said moat to each of said reservoirs, a bucket connected to each end of said beam, each of said buckets having an outlet, a valve member for sequentially opening and closing said outlet, and means for actuating said reservoir valve and said bucket valve member in a predetermined sequence whereby the valve of one reservoir is shifted to an open position as the valve of the other reservoir is closed, and means for sequentially actuating the valve member of the elevating bucket to a closed position and shifting the valve member of the other bucket to an open position as it reaches it lower position, said means for sequentially actuating the respective valve members controlling the emptying of the respective buckets comprises a linkage system responsive to the movement of its corresponding bucket between an elevated and lower position to effect the closing of the valve member in the elevated position of the corresponding bucket and the opening of the valve member of said corresponding bucket in the lower position thereof.

15. A water engine comprising:

a base, a moat for containing a supply of water disposed adjacent said base, a rocking beam mounted on said base, said beam having opposed ends arranged to rise and fall, a transverse axle connected to said beam adjacent its midpoint about which the beam rocks as said opposed ends alternately rise and fall between an elevated and lower position to impart an oscillation motion to said axle, a pair of reservoirs, each of said reservoirs being supported above a corresponding opposed end of said rocking beam, each of said reservoirs having a discharge opening, a valve for sequentially opening and closing said discharge opening of its respective reservoir, means for pumping water from said moat to each of said reservoirs, a bucket connected to each end of said beam, each of said buckets having an outlet, a valve member for sequentially opening and closing said outlet, and means for actuating said reservoir valve and said bucket valve member in a predetermined sequence whereby the valve of one reservoir is shifted to an open position as the valve of the other reservoir is closed, and means for sequentially actuating the valve member of the elevating bucket to a closed position and shifting the valve member of the other bucket to an open position as it reaches it lower position, said means for sequentially operating said valve controlling the discharge of water from the respective reservoirs comprises:

a linkage system interconnected between said beam adjacent the bucket carried on the end of said beam and said valve of a corresponding reservoir whereby said reservoir valve is shifted to the open position when said bucket of said corresponding reservoir is in the elevated position and shifted to a closed position as said elevated bucket begins to descend toward its lower position.

16. A water engine comprising:

a base, a structural frame mounted on said base, a moat adjacent said base for containing a supply of water, a pedestal supported on said base, a rocking beam having a transverse axle connected thereto, said axle being supported on said pedestal, said rocking beam having opposed end portions arranged to alternately seesaw about said axle between an elevated and lowered position to impart an oscillating motion to said axle, a bucket for receiving a predetermined quantity of water connected to each end of said beam, each of said buckets having a discharge opening formed in the bottom thereof, and a valve member for opening and closing said discharge opening, a reservoir mounted on said frame above each of said buckets, each of said reservoirs having a water discharge opening, and a plug valve for opening and closing said discharge opening of its respective reservoir, a linkage system responsive to the seesaw motion of said rocking beam to effect the sequential actuation of each of the respective bucket valves whereby said bucket valve is opened in the lower-most position of said bucket and closed in the elevated position of said bucket, a second linkage system responsive to the seesaw motion of the rocking beam to sequentially open the plug valve of one of said reservoirs when its corresponding bucket is in the upper position and closing the plug valve of the other reservoir when its corresponding bucket is descending to its lower position.

17. A water engine as defined in claim 16 and including a transmission means for translating the oscillating motion of said oscillating axle into a rotary motion.

18. A water engine as defined in claim 16 and including a pair of tanks supported on said rocking beam to either side of said transverse axle, each of said tanks being generally conical in shape whereby each of said tanks diverge outward to said opposed ends of said beam, and a weighted medium is disposed in each of said tanks.

19. A water engine as defined in claim 16 and including dampening means interposed between the opposed ends of said beam and said base to dampen any input imparted during operation of the rocking beam.

20. A water engine as defined in claim 16 wherein said dampening means includes a telescoping sleeve and rod pivotally interconnected between said rocking beam and said base,
   a spring assembly loosely mounted on said rod adjacent said base whereby said spring assembly absorbs the impact of said sleeve as said rocking beam bottoms out at the lower most position of the respective buckets mounted thereon.

21. A water engine as defined in claim 20 and including a means slidably mounted on said rod for adjusting the distance between the rise and fall of the respective buckets.

22. A water engine comprising:

a rocking beam having opposed ends, a fulcrum supporting said rocking beam intermediate said opposed ends to seesaw thereabout, a weighted member supported on said rocking beam on either side of said fulcrum, each of said weighted members being proportioned so that the weight thereof progressively increases as said weighted member extends away from said fulcrum, a receptacle mounted on at least one of said opposed ends of said rocking beam, a water supply for periodically distributing a predetermined amount of water to said receptacle sufficient to overbalance the other end of said rocking beam, and causing said water weighted one end of said beam to fall to a predetermined lower level, said receptacle having a valve operative to open as said water weighted end of said rocking beam falls to said predetermined lower level to empty the water from said receptacle, said other end of said rocking beam being weighted to overbalance said one end to raise said receptacle thereon to a predetermined upper lever, and a transmission connected to said rocking beam for translating the seesawing motion to said rocking beam to rotary motion.

* * * * *